(12) United States Patent
Fujimura et al.

(10) Patent No.: US 9,425,585 B2
(45) Date of Patent: Aug. 23, 2016

(54) INSULATOR AND SPARK PLUG

(71) Applicant: NGK Spark Plug Co., Ltd., Nagoya-shi, Aichi (JP)

(72) Inventors: Kengo Fujimura, Aichi-ken (JP); Toshimasa Saji, Aichi-ken (JP); Hirokazu Kurono, Aichi-ken (JP); Toshitaka Honda, Aichi-ken (JP)

(73) Assignee: NGK Spark Plug Co., Ltd., Nagoya-shi (JP)

( * ) Notice: Subject to any disclaimer, the term of this patent is extended or adjusted under 35 U.S.C. 154(b) by 77 days.

(21) Appl. No.: 14/185,952

(22) Filed: Feb. 21, 2014

(65) Prior Publication Data

US 2014/0243184 A1    Aug. 28, 2014

(30) Foreign Application Priority Data

Feb. 22, 2013  (JP) ................................. 2013-032827
Jan. 17, 2014  (JP) ................................. 2014-006309

(51) Int. Cl.
*C04B 35/00* (2006.01)
*H01T 13/38* (2006.01)
*H01B 3/12* (2006.01)
(Continued)

(52) U.S. Cl.
CPC ............. *H01T 13/38* (2013.01); *C04B 35/111* (2013.01); *C04B 35/6263* (2013.01); *H01B 3/12* (2013.01); *C04B 2235/3206* (2013.01); *C04B 2235/3208* (2013.01); *C04B 2235/3215* (2013.01); *C04B 2235/3217* (2013.01); *C04B 2235/3227* (2013.01); *C04B 2235/3418* (2013.01); *C04B 2235/5436* (2013.01);
(Continued)

(58) Field of Classification Search
CPC ... C04B 35/10; C04B 35/101; C04B 35/111; C04B 35/11; H01T 3/00; H01T 3/02; H01T 3/20; H01T 3/38
USPC .................................. 313/118, 143; 501/153
See application file for complete search history.

(56) References Cited

U.S. PATENT DOCUMENTS 8,093,791 B2 *  1/2012  Kurono et al. ................ 313/143
8,390,183 B2    3/2013  Kurono et al. ................ 313/118
(Continued)

FOREIGN PATENT DOCUMENTS

EP    2 259 395    12/2010    ............. H01T 13/38
EP    2 451 034    5/2012     ............. H01T 13/38
(Continued)

OTHER PUBLICATIONS

European Search Report (dated Jun. 11, 2014) issued in connection with corresponding European Patent Application No. 14155744.7.
(Continued)

*Primary Examiner* — Noah Wiese
(74) *Attorney, Agent, or Firm* — Kusner & Jaffe

(57) ABSTRACT

An insulator used in a spark plug having improved strength and dielectric strength performance. The insulator comprises a sintered compact whose main constituent is alumina. In the sintered compact, a content ratio of a rare earth element (R. E.) and a group 2 element (2A) satisfies $0.1 \leq R.E./2A \leq 1.4$, and the content ratio of the R. E. and barium oxide (BaO) satisfies $0.2 \leq BaO/R.E. \leq 0.8$. At least one virtual rectangular frame of 7.5 μm×50 μm surrounding crystals containing the rare earth element lies within a region of 630 μm×480 μm in any cross section of the sintered compact.

9 Claims, 3 Drawing Sheets

(51) Int. Cl.
*C04B 35/111* (2006.01)
*C04B 35/626* (2006.01)

(52) U.S. Cl.
CPC .. *C04B 2235/5463* (2013.01); *C04B 2235/77* (2013.01); *C04B 2235/96* (2013.01)

(56) References Cited

U.S. PATENT DOCUMENTS

| | | | |
|---|---|---|---|
| 2007/0298245 A1 | 12/2007 | Ogata et al. | 428/329 |
| 2008/0309388 A1 | 12/2008 | Hashimoto et al. | 327/161 |
| 2010/0084960 A1* | 4/2010 | Kurono et al. | 313/118 |
| 2010/0136867 A1* | 6/2010 | Kurono et al. | 445/7 |
| 2012/0080996 A1* | 4/2012 | Takaoka et al. | 313/141 |
| 2012/0187819 A1* | 7/2012 | Takaoka et al. | 313/118 |
| 2012/0262049 A1* | 10/2012 | Kurono et al. | 313/141 |
| 2012/0319556 A1* | 12/2012 | Suzuki et al. | 313/141 |

FOREIGN PATENT DOCUMENTS

| | | | |
|---|---|---|---|
| EP | 2 451 035 | 5/2012 | H01T 13/38 |
| JP | 2008024583 A | 2/2008 | C04B 35/111 |
| JP | 4607253 | 10/2010 | H01T 13/38 |
| WO | WO2009/119097 | 1/2009 | C04B 35/111 |
| WO | WO 2011/036853 | 3/2011 | H01T 13/38 |
| WO | WO2011/001699 | 6/2011 | C04B 35/111 |

OTHER PUBLICATIONS

Office Action dated Jan. 28, 2015 issued in connection with correspondingJapanese Patent Application No. 2014-006309 (with English translation).

Office Action dated Sep. 2, 2015 issued in connection with corresponding Japanese Patent Application No. 2014-006309 (with English translation).

* cited by examiner

INSULATOR AND SPARK PLUG

FIELD OF THE INVENTION

The present invention relates to an insulator and a spark plug having the insulator.

BACKGROUND OF THE INVENTION

In general, spark plugs used for ignition of an internal combustion engine such as a gasoline engine include a center electrode, an insulator provided to the outside of the center electrode, a metal shell provided to the outside of the insulator, and a ground electrode installed to the metal shell and forming a spark discharge gap between itself and the center electrode. The insulator of such spark plug is made of an aluminum sintered compact containing a rare earth element constituent, a silicon constituent, and a group 2 element (see Japanese Patent No. 4607253, "Patent Document 1").

Conventionally, improvement in the dielectric strength property has been desired for the insulator used for the spark plug. In order to improve the dielectric strength property of the insulator, the composition of the materials of the insulator has been optimized or the material has been micronized.

However, the change in the composition of the material of the insulator is likely to cause the problem of the degradation of a part of the performance and, further, the micronized material may cause the excessive sintering resulting in the abnormal particle growth and the decreased density, which is likely to cause the reduction in the strength and/or the dielectric strength performance of the insulator. Improvement in strength and dielectric strength performance of an insulator used in a spark plug is desired.

SUMMARY OF THE INVENTION

The present invention has been achieved for overcoming the above-described problems and can be implemented as the following forms.

(1) According to one form of the present invention, provided is an insulator that is used for a spark plug and made of a sintered compact whose main constituent is alumina. In this insulator, in the sintered compact, a content ratio of a rare earth element to a group 2 element, which is listed in the periodic table of elements based on IUPAC Recommendation 1990, in terms of an oxide represented by mass percentage satisfies a range from 0.1 to 1.4; a content ratio of the barium oxide to the rare earth element in terms of an oxide represented by mass percentage satisfies a range from 0.2 to 0.8; and at least one virtual rectangular frame of 7.5 μm×50 μm surrounding crystals containing the rare earth element lies within a region of 630 μm×480 μm in any cross section of the sintered compact; and, in the rectangular frame, an occupancy ratio of an area of the crystal containing the rare earth element to an area of the rectangular frame is greater than or equal to 5%; and, in each of the divided regions when the rectangular frame is equally divided into three in a direction of a long side, a ratio of a maximum area occupancy ratio and a minimum area occupancy ratio of the area occupancy ratios of the crystal containing the rare earth element is less than or equal to 5.5%. Such form of the insulator results in the shape where the crystal phase containing the rare earth element is condensed thin. When the dielectric breakdown occurs at the application of a voltage to the insulator, the thin crystal phase containing the rare earth element prevents the current from passing, so that the current flows so as to circumvent the thin crystal phase containing the rare earth element, which results in the elongated conductive path. As a result, the dielectric strength performance is improved. Further, according to this form of the insulator, the crystal phase containing the rare earth element is formed so that the crystal phase containing the rare earth element is condensed thin, which allows for the increased toughness value and thus the improved strength of the insulator.

(2) In the above form of the insulator, ten or more rectangular frames may lie within the above-described region of 630 μm×480 μm in any cross section of the sintered compact. According to this form of the insulator, the thin condensed crystal phase containing the rare earth element of the above-described region tends to be thinner, which allows the toughness and the strength of the insulator to be further improved.

(3) In the above form of the insulator, an average particle diameter of the alumina particles contained in the sintered compact may be less than or equal to 8 μm and an average particle diameter of the crystal containing the rare earth element may be less than or equal to 5 μm. According to this form of the insulator, the average particle diameter of the crystal containing the rare earth element is less than or equal to 5 μm, which allows for the suppression of the damage in the insulator such as the occurrence of a fine crack due to the difference in the thermal expansion between itself and the glass phase or alumina in the cooling process after a depositing of the crystal, so that the reduction in the strength of the insulator can be suppressed.

(4) In the above form of the insulator, the sintered compact may contain silicon dioxide and, in the sintered compact, a content ratio of the silicon dioxide in terms of an oxide represented by mass percentage may be greater than or equal to 2.2 wt % and less than or equal to 3.2 wt %. According to this form of the insulator, the crystal phase containing the rare earth element can be further effectively formed, which allows for further improvement in the dielectric strength property and the strength of the insulator.

(5) In the above form of the insulator, the sintered compact may contain silicon dioxide and, in the sintered compact, the content ratio of the silicon dioxide in terms of an oxide represented by mass percentage may be greater than or equal to 2.1 wt % and less than or equal to 2.6 wt %. This form of the insulator allows for further improvement in the dielectric strength property of the insulator.

(6) One form of the present invention, a spark plug having the above form of the insulator is provided. According to this form of the spark plug, the insulator with a high dielectric strength property and strength can be used as the insulator of the spark plug. Therefore, the spark plug with high durability can be provided.

The present invention can be implemented in various forms other than a device. For example, it can be implemented in the forms such as a manufacturing method and its control method of the insulator and the spark plug, a computer program achieving that control method, a non-temporary recording medium in which the computer program is recorded, and the like.

DETAILED DESCRIPTION OF THE INVENTION

A. First Embodiment

A1. General Configuration of a Spark Plug

Figure 1:
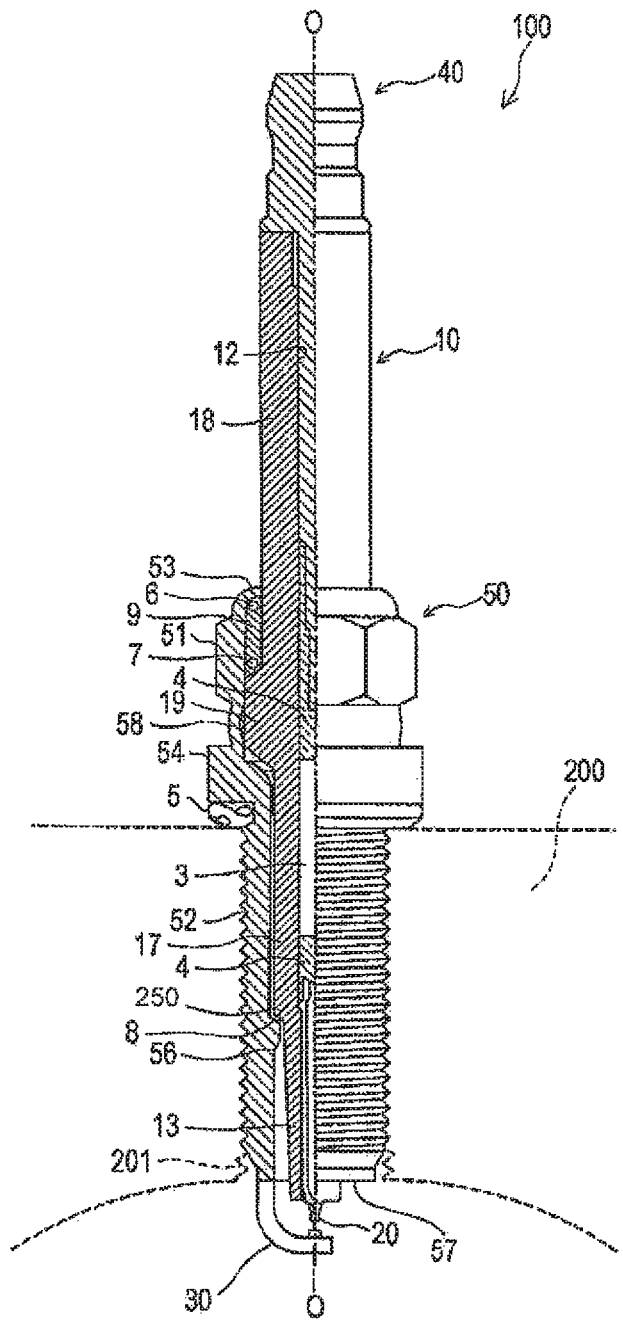
FIG. 1 is a partial sectional view of a spark plug 100 in a first embodiment.

FIG. 1 is a partial sectional view of a spark plug 100 in the first embodiment. The spark plug 100 has a thin shape along an axial line O as shown in FIG. 1. In FIG. 1, the right side of the axial line O-O depicted by a dotted line illustrates an outlined front view, and the left side of the axial line O-O illustrates a sectional view where the spark plug 100 is cut along the cross section passing the center axis of the spark plug 100. In the following description, the lower side of FIG. 1 parallel to the axial line O-O is referred to as the front end side and the upper side of FIG. 1 is referred to as the rear end side.

The spark plug 100 includes an insulator 10, a center electrode 20, a ground electrode 30, a terminal metal fitting 40, and a metal shell 50. The bar-shaped center electrode 20 projecting out of one end of the insulator 10 is electrically connected to the terminal metal fitting 40 provided to the other end of the insulator 10 through the inside of the insulator 10. The outer circumference of the center electrode 20 is held by the insulator 10, and the outer circumference of the insulator 10 is held by the metal shell 50 at the position distant from the terminal metal fitting 40. The ground electrode 30 electrically connected to the metal shell 50 forms a spark gap between the center electrode 20 and the front end that is a gap for generating a spark. The spark plug 100 is installed via the metal shell 50 to an installation thread opening 201 provided to an engine head 200 of an internal combustion engine. Application of the high voltage of 20,000 to 30,000 volts to the terminal metal fitting 40 generates a spark at the spark gap formed between the center electrode 20 and the ground electrode 30.

The insulator 10 is an insulator made of an alumina sintered compact that is formed by sintering the ceramic material such as alumina. The insulator 10 is a cylindrical member, at the center of which an axial hole 12 accommodating the center electrode 20 and the terminal metal fitting 40 is formed. At the center in the axial direction of the insulator 10, a center body part 19 having an increased diameter is formed. In the more terminal metal fitting 40 side than the center body part 19, a rear end body part 18 that insulates the terminal metal fitting 40 from the metal shell 50 is formed. In the side closer to the center electrode 20 than the center body part 19, a front end body part 17 having a smaller outer diameter than the rear end body part 18 is formed and, in further end side of the front end body part 17, a nose portion 13 having an outer diameter that is less than the outer diameter of the front end body part 17 and tapered to the front end side is formed. It is noted that the nose portion 13 may be a straight shape having a constant outer diameter or a shape having a step(s).

The metal shell 50 is a cylindrical metal part that surrounds and holds a portion lying from a part of the rear end body part 18 of the insulator 10 to the nose portion 13. In the present embodiment, the metal shell 50 is formed with low-carbon steel, and a plating process such as a nickel plating or a zinc plating is applied entirely. The metal shell 50 includes a tool engaging part 51, an installation thread part 52, and a seal part 54. Into the tool engaging part 51 of the metal shell 50, a tool (not shown) for installing the spark plug 100 to the engine head 200 is engaged. The installation thread part 52 of the metal shell 50 has a tread ridge that screws with the installation thread opening 201 of the engine head 200. The seal part 54 of the metal shell 50 is formed in a flange shape at the base of the installation thread part 52, and an annular gasket 5 that is a bent plate is engaged between the seal part 54 and the engine head 200. A front end surface 57 of the metal shell 50 is a hollow circle, and the center electrode 20 projects from the nose portion 13 of the insulator 10 at the center of the front end surface.

The rear end side of the tool engaging part 51 of the metal shell 50 is provided with a thin crimping part 53. Further, similarly to the crimping part 53, a thin compressed deformation part 58 is provided between the seal part 54 and the tool engaging part 51. Annular ring members 6 and 7 are interposed between the inner circumference surface of the metal shell 50 and the outer circumference surface of the rear end body part 18 of the insulator 10 lying from the tool engaging part 51 and the crimping part 53, and powders of talc 9 are filled between the ring members 6 and 7. At the manufacturing of the spark plug 100, the crimping part 53 is pressed toward the front end side so as to be bent inward and thereby the compressed deformation part 58 is compressed and deformed, and the compression and deformation of the compressed deformation part 58 causes the insulator 10 to be pressed toward the front end side within the metal shell 50 via the ring members 6 and 7 and the talc 9. This pressing allows the talc 9 to be compressed in the direction of the axial line O-O and the airtightness in the metal shell 50 to be enhanced.

Further, in the inner circumference of the metal shell 50, an engaging part 250 located at the base end of the nose portion 13 of the insulator 10 is pressed via an annular plate packing 8 to a metal shell inner step 56 formed at the position of the installation thread part 52. The plate packing 8 is a member that maintains the airtightness between the metal shell 50 and the insulator 10, which prevents the leakage of the combustion gas.

The center electrode 20 is a bar-shaped member having a core material (not shown) embedded inside an electrode base material (not shown) whose thermal conductivity is superior to the electrode base material. In the present embodiment, the electrode base material is made of a nickel alloy whose main constituent is nickel, and the core material is copper or an alloy whose main constituent is copper. The rear end part of the center electrode 20 is electrically connected to the terminal metal fitting 40 via a ceramic resistor 3 and a seal body 4.

The ground electrode 30 is made of a metal with a high corrosion resistance and, as an example, a nickel alloy may be used for it. The base end of the ground electrode 30 is welded to the front end surface 57 of the metal shell 50. The front end side of the ground electrode 30 is bent in the direction crossing the axial line O-O, the front end part of the ground electrode 30 faces the front end surface of the center electrode 20 on the axial line O-O. It is noted that, similarly to the center electrode 20, the ground electrode 30 may be formed with a bar-shaped member having a core material embedded inside an electrode base material whose thermal conductivity is superior to the electrode base material.

A2. Details of Composition of the Insulator 10

Figure 2A:
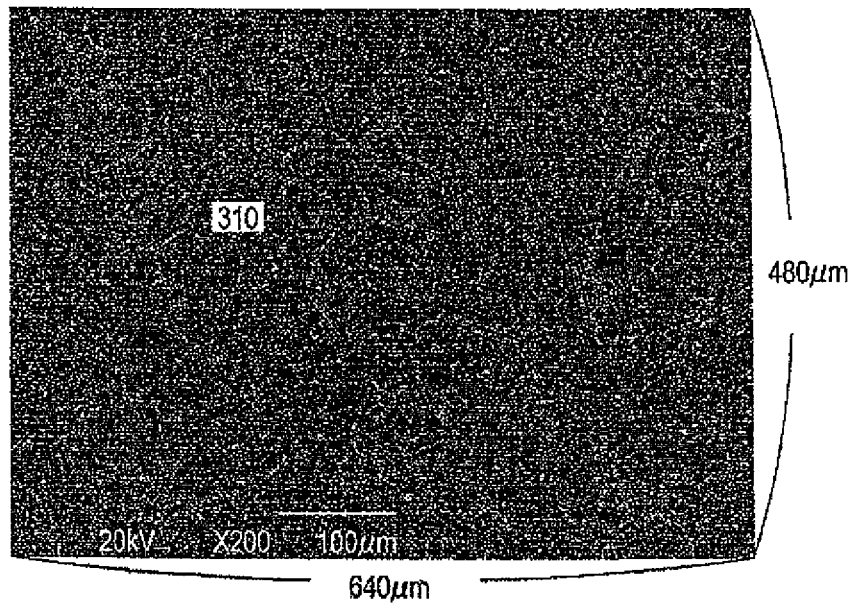
FIG. 2A and FIG. 2B are schematic views illustrating a composition of an insulator 10 in the first embodiment.
Figure 2B:
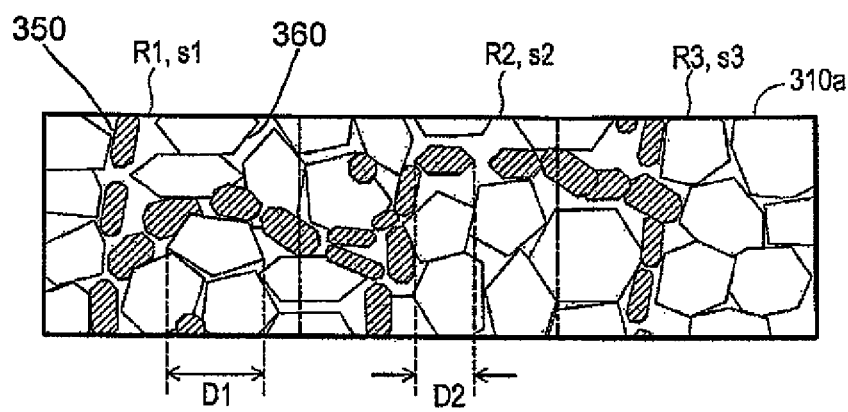

FIG. 2 is a schematic view illustrating the composition of an insulator 10 in the first embodiment. FIG. 2A is an enlarged sectional view 300 in which a particular region of 630 μm×480 μm in the cross section of the insulator 10 is magnified by 200 times. FIG. 2B is a schematic view schematically illustrating an enlarged rectangular frame 310 in FIG. 2A.

In the alumina sintered compact of the insulator 10, the content ratio of the rare earth element to the group 2 element, which is listed in the periodic table of the elements based on IUPAC Recommendation 1990, in terms of an oxide represented by mass percentage satisfies a range from 0.1 to 1.4, and the content ratio of the barium oxide to the rare earth element in terms of an oxide represented by mass percentage satisfies a range from 0.2 to 0.8. Hereafter, in the present specification, the rare earth element is denoted as R. E. and the group 2 element is denoted as 2A.

In FIG. 2A, the areas in white are the crystal phase containing the R. E. and the other areas in gray occupying most area are the alumina particles. It is noted that, in FIG. 2B, crystals 350 containing the R. E. are depicted with the hatching of oblique lines, and alumina particles 360 are depicted in white.

The rectangular frame 310 is a virtual rectangular frame of 7.5 μm×50 μm surrounding the crystal 350 containing the R. E. At least one rectangular frame 310 lies within the enlarged sectional view 300 without overlapping, as shown in FIG. 2A. In the first embodiment, ten or more rectangular frames 310 lie within the enlarged sectional view 300. When multiple rectangular frames 310 lie within the enlarged sectional view 300, respective rectangular frames 310 are arranged so as not to overlap with each other within the enlarged sectional view 300.

Further, in the rectangular frame 310, the occupancy ratio of an area S1 of the crystals 350 containing the R. E. to an area S of the rectangular frame 310 is greater or equal to 5%. For example, when the area S of the rectangular frame 310 is 375 μm$^2$ and the area S1 of the crystal 350 containing R. E. in the rectangular frame 310 is 22.5 μm$^2$, the occupancy ratio of the area S1 to the area S is 6%. That is, when the area S of the rectangular frame 310 is 375 μm$^2$, the area S1 may satisfy S1≥18.75 μm$^2$.

Further, in the rectangular frame 310, as illustrated by the dotted lines in FIG. 2B, in each of the divided regions (R1 to R3) when the rectangular frame 310 is equally divided into three in the direction of the long side 310a, the ratio of the maximum area occupancy ratio Pa to the minimum area occupancy ratio Pb of the area occupancy ratios of the crystal 350 containing the R. E. is less than or equal to 5.5%. For example, in the first embodiment, when the area S of the rectangular frame 310 is 375 μm$^2$, it results in the area s1 of the region R1=the area s2 of the region R2=the area s3 of the region R3=125 μm$^2$. In this case, when the area of the crystal 350 containing the R. E. in the region R1 is 10 μm$^2$, the area of the crystal 350 containing the R. E. in the region R2 is 7.5 μm$^2$, and the area of the crystal 350 containing the R. E. in the region R3 is 5 μm$^2$, it results in that the area occupancy ratio of the crystal 350 containing the R. E. in the region R1 is 8%, the area occupancy ratio of the crystal 350 containing the R. E. in the region R2 is 6%, and the area occupancy ratio of the crystal 350 containing the R. E. in the region R3 is 4%, and therefore the ratio of the maximum area occupancy ratioe Pa (the area occupancy ratio of the crystal 350 containing the R. E. in the region R1 is 8%) to the minimum area occupancy ratio Pb (the area occupancy ratio of the crystal 350 containing the R. E. in the region R3 is 4%) of the area occupancy ratios of the crystal 350 containing the R. E. in the divided regions R1 to R3 is 2, which is less than or equal to 5.5.

Here, described will be a calculation process for the area of crystal 350 containing the R. E. The alumina sintered compact is cut and machined to obtain a flat surface. Then, the mirror polishing is applied using a diamond disc or the like. A field (630 μm×480 μm, 200 magnification power) of the polished surface is observed with a reflected electron image using a scanning electron microscope (JEOL Ltd., JSM6460LA) to obtain an image. Furthermore, binarization is applied to the obtained image and thereby the occupying area of the crystal 350 containing the R. E can be derived. In the process of the binarization of the image, the Photoshop elements 2.0 is used and the level where the illuminance is 96.8%±0.2% in the histogram of the image is set as a threshold for dividing it into two gradations to obtain a two-gradation image. As a result, the crystal phases containing the R. E. are represented in white and other alumina phase and the like are represented in black. In this image, a virtual rectangle of 7.5 μm×50 μm (the rectangular frame 310) is set to derive the ratio (the occupancy ratio) of the portion containing the R. E. occupying the rectangular frame 310 when arranged so that the white portions, that is, the crystals 350 containing the R. E. are encompassed in the rectangular frame 310 as much as possible. In deriving the occupancy ratio, it can be calculated by the histogram of the image and the like using the Photoshop elements 2.0, for example, because the image has been binarized.

Further, it can be confirmed by the following process that the R. E. is contained in the crystal 350. The crystal phase of the alumina sintered compact may be confirmed by using an energy dispersive X-ray spectrometry (EDX) (EDAX, EDX: "Genesis 4000", detector: SUTW3.3RTEM) installed to a transmission electron microscope (TEM) (HITACHI, "HD-2000") to perform the element analysis under the measuring conditions such as follows.

<Measuring Conditions>
(1) Acceleration voltage: 200 kV
(2) Irradiation mode: HR (spot size: approximately 0.3 nm)
(3) The measured result of the energy dispersive X-ray spectrometry (EDX) is calculated in mass % in terms of an oxide. It is noted that the oxide other than the oxide of the group 2 constituent, the rare earth constituent, and the Al constituent whose the mass % in terms of an oxide is 1 mass % or less is defined as the impurity.

Further, the average particle diameter D1 of the alumina particles 360 contained in the alumina sintered compact of the insulator 10 is less than or equal to 8 μm, and the average particle diameter D2 of the crystals 350 containing the R. E. is less than or equal to 5 μm. It is noted that, in the present specification, the average particle diameter of the crystals is measured using the intercept method and, for example, is the diameter measured as described below. An alumina sintered compact is cut and machined to obtain a flat surface. Further, the diamond disc or the like is used to perform a mirror polishing. Then, the process such as a thermal etching or a chemical etching may be applied as appropriate. Next, a structure image is obtained by the scanning electron microscope (SEM) at a predetermined magnification (for example, approximately 2000 magnification power). A few lines whose total length corresponds to a predetermined length (for example, 500 μm) are drawn at random. The number of particles traversed by the lines is then counted, and the value obtained by dividing the length (for example, 500 μm) of the line by the number of particles on the image results in the average particle of the crystals.

Further, the alumina sintered compact of the insulator 10 contains silicon dioxide (Si) and, in the alumina sintered compact, the content ratio of silicon dioxide ($SiO_2$) in terms of an oxide represented by mass percentage is greater than or equal to 2.0 wt % and less than or equal to 3.4 wt %.

The insulator 10 as described above is formed such that the crystal phase containing the R. E. is arranged thin in a chain manner, as shown in FIG. 2.

A3. Manufacturing Method

The manufacturing method of the insulator 10 will be described. Firstly, a slurry containing the raw material powder of the insulator 10 is fabricated. As an example of the fabrication method of the slurry, the raw material powder containing alumina ($Al_2O_3$) as a main constituent and silicon dioxide ($SiO_2$), manganese oxide (MgO), barium oxide (BaO), calcium oxide (CaO), lanthanum oxide ($La_2O_3$), and the like is prepared, and the slurry is obtained by mixing such raw material powder with ethanol in the ball mill for approximately 24 hours. The slurry is adjusted so that the content ratio of the R. E. to the 2A in terms of an oxide represented by mass percentage satisfies a range from 0.1 to 1.4, and the content ratio of the barium oxide (BaO) to the R. E. in terms of an oxide represented by mass percentage satisfies a range from 0.2 to 0.8. Further, the slurry is adjusted so that the granularity is such that a ratio (D90/D10) of the particle diameter (D10) where the accumulation volume of the particles is 10% and the particle diameter (D90) where the accumulation volume of the particles is 90% is greater than or equal to 3.5 and less than or equal to 6.0, that a slurry moisture ranges greater than or equal to 20% and less than or equal to 50%, and that the pH of the slurry ranges greater than or equal to 5 and less than or equal to 11. A binder is added to the fabricated slurry and stirred, so that the slurry to which the binder is added can be obtained. The binder may be, for example, acrylic copolymer solution or polyvinyl alcohol to which a hydrophilic binding agent is combined, a water-soluble acrylic resin, a gum arabic, a dextrin, and the like. While the amount of the added binder is not limited in particular, 0.5% by weight to 15% by weight may be exemplified as the ratio of the binder occupying the slurry.

The slurry to which the binder has been added is dried by the spray dryer and pelletized. In the first embodiment, the spraying of the spray drying is made by a rotation disc and the number of disc revolution is adjusted to 15000 rpm, and the hot blast temperature is adjusted to 200° C. at the dry chamber inlet port. This allows for obtaining the granules (spray granules) containing the raw material powder and the binder. The obtained granules are pressed and molded in the shape of the insulator 10. While there is no particular limitation also for the pressure in the pressing, approximately 2000 kgf/cm$^2$ may be exemplified. This press-molding allows for obtaining a ceramic compact that is molded in the shape of the insulator 10.

A4. Evaluation Result

With respect to the spark plug 100 having the insulator 10 with the above-described features, the dielectric strength performance and the performance of the spark plug were examined and evaluated, the result of which is as follows. Table 1 indicates the examination result of the heat dielectric strength performance and the bending strength with respect to the composition of the insulator 10. Table 2 indicates the examination result and the evaluation of the heat dielectric strength performance and the bending strength with respect to the number of the thin condensed groups containing the R. E.

Figure 3A:
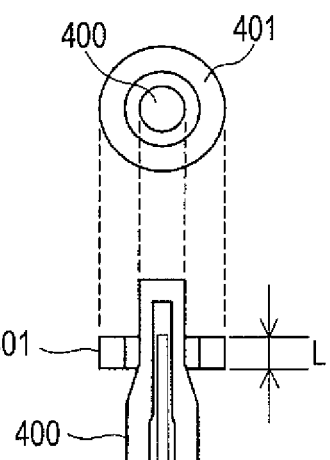
FIG. 3A and FIG. 3B are schematic views illustrating an apparatus for measuring dielectric strength.
Figure 3B:
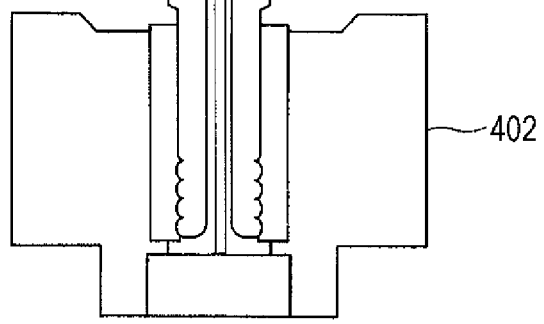

In the examination for evaluating the dielectric strength performance, the dielectric strength of each sample under a high temperature was measured. FIG. 3 illustrates the equipment for measuring the dielectric strength. FIG. 3A is a perspective view of a sintered compact 400 and a metal ring 401 adapted to cause the dielectric breakdown and FIG. 3B is a sectional view of the sintered compact 400 and the ring 401. The ring 401 has an axial line length L of 3 to 4 mm and fixed without contact near the front end of the sintered compact 400 by not-shown fixing means. One end of the sintered compact 400 is fixed by a base part 402 and the other end projects from the base part 402. In the dielectric strength evaluation under the high temperature, the portion of the sintered compact 400 projecting from the base part 402 was heated at a high frequency up to 600° C. to 950° C., and the voltage when the portion close to the metal ring 401 of the sintered compact 400 that is easily heated reached 800° C. was measured as the dielectric strength value of the sample.

In the examination for evaluating the bending strength, measurement was made by using the sample with the size of 36×4×3 mm and setting the three-point bending strength to a span of 30 mm by the method conforming to "JIS R 1604".

In Table 1, respective items represent the followings. It is noted that, in the following, the "content ratio" refers to the content ratio in terms of an oxide represented by mass percentage unless otherwise noted.

$Al_2O_3$: the content ratio of alumina $SiO_2$: the content ratio of silicon dioxide MgO: the content ratio of magnesium BaO: the content ratio of barium oxide CaO: the content ratio of calcium oxide $La_2O_3$: the content ratio of lanthanum oxide R. E./2A: the content ratio of the rare earth element to the group 2 element BaO/R. E.: the content ratio of the barium oxide to the rare earth element Dielectric strength: the dielectric strength performance of the spark plug (the insulator 10) when heated at 800° C.

Bending strength: the bending strength of the spark plug (the insulator 10)

Condensed group: whether or not there is a thin condensed group of the crystal phase containing the R. E. (whether molded or not)

A represents that there is a condensed group

B represents that there is no condensed group

In Table 2, respective items represent the followings.

The number of condensed groups: the number of virtual rectangles of 7.5 μm×50 μm surrounding the crystal phase containing the R. E. within the enlarged sectional view 300 without overlapping Bending strength, Measured value: the measured value of the bending strength of the spark plug (the insulator 10)

Bending strength, Performance: the evaluation result of the bending strength of the spark plug (the insulator 10)

A represents GOOD (significantly improved from the conventional one)

B represents OK (improved from the conventional one)

C represents NG (the same as the conventional one)

Dielectric strength, Measured value: the measured value of the dielectric strength performance of the spark plug (the insulator 10) when heated at 800° C.

Dielectric strength, Performance: evaluation result of the dielectric strength performance of the spark plug (the insulator 10) when heated at 800° C.

A represents GOOD (significantly improved from the conventional one)

B represents OK (improved from the conventional one)

C represents NG (the same as the conventional one)

TABLE 1

| | Sample No. | Al₂O₃ | SiO₂ | MgO | BaO | CaO | La₂O₃ | R.E./2A | BaO/R.E. | Dielectric strength performance (800° C.) (kV) | Bending strength (MPa) | Condensed group |
|---|---|---|---|---|---|---|---|---|---|---|---|---|
| Examples | 1 | 93.3 | 3.0 | 0.39 | 0.40 | 2.55 | 0.39 | 0.1 | 1.0 | 35 | 490 | A |
| | 2 | 95.3 | 3.0 | 0.60 | 0.08 | 2.70 | 0.39 | 0.1 | 0.2 | 36 | 520 | A |
| | 3 | 93.0 | 2.2 | 0.04 | 2.10 | 0.04 | 2.62 | 1.2 | 0.8 | 36 | 500 | A |
| | 4 | 93.0 | 2.2 | 0.00 | 0.50 | 1.68 | 2.62 | 1.2 | 0.2 | 34 | 500 | A |
| | 5 | 92.7 | 3.3 | 1.08 | 0.69 | 1.08 | 1.15 | 0.4 | 0.6 | 27 | 510 | A |
| | 6 | 93.5 | 2.5 | 0.95 | 0.60 | 0.95 | 1.50 | 0.6 | 0.4 | 36 | 490 | A |
| | 7 | 93.0 | 3.0 | 0.57 | 1.08 | 0.57 | 1.79 | 0.8 | 0.6 | 29 | 490 | A |
| | 8 | 93.3 | 2.7 | 0.75 | 0.72 | 0.75 | 2.00 | 0.9 | 0.4 | 34 | 500 | A |
| | 9 | 93.5 | 2.5 | 1.33 | 0.39 | 1.33 | 0.95 | 0.3 | 0.4 | 35 | 510 | A |
| | 10 | 97.0 | 2.2 | 0.03 | 0.30 | 0.03 | 0.44 | 1.2 | 0.7 | 32 | 490 | A |
| | 11 | 96.4 | 3.2 | 0.07 | 0.10 | 0.07 | 0.16 | 0.7 | 0.6 | 28 | 490 | A |
| | 12 | 94.0 | 3.4 | 0.10 | 0.90 | 0.10 | 1.50 | 1.4 | 0.6 | 36 | 490 | A |
| Compared examples | 1 | 93.5 | 2.5 | 1.65 | 0.35 | 1.65 | 0.35 | 0.1 | 1.0 | 20 | 390 | B |
| | 2 | 93.5 | 2.5 | 1.81 | 0.04 | 1.81 | 0.35 | 0.1 | 0.1 | 20 | 370 | B |
| | 3 | 93.5 | 2.5 | 0.76 | 0.23 | 0.76 | 2.26 | 1.3 | 0.1 | 21 | 380 | B |
| | 4 | 93.5 | 2.5 | 0.02 | 1.70 | 0.02 | 2.26 | 1.3 | 0.8 | 22 | 375 | B |
| | 5 | 93.7 | 2.5 | 0.02 | 1.55 | 0.02 | 2.26 | 1.4 | 0.7 | 20 | 385 | B |
| | 6 | 93.3 | 2.5 | 0.02 | 1.90 | 0.02 | 2.26 | 1.2 | 0.8 | 22 | 380 | B |

TABLE 2

| | Bending strength | | Dielectric strength (800° C.) | |
|---|---|---|---|---|
| The number of condensed groups | Measured value (MPa) | Performance | Measured value (kV) | Performance |
| 0 | 390 | C | 22.0 | C |
| 3 | 440 | B | 27.0 | B |
| 6 | 445 | B | 28.0 | B |
| 9 | 455 | B | 28.5 | B |
| 10 | 500 | A | 34.0 | A |
| 13 | 495 | A | 36.0 | A |
| 15 | 520 | A | 38.0 | A |
| 18 | 495 | A | 35.0 | A |
| 20 | 520 | A | 37.0 | A |

As indicated in Table 1, the insulators 10 of Examples 1 to 10 that have the composition with a content ratio of the R. E. to the 2A satisfying a range from 0.1 to 1.4, and a content ratio of the BaO to the R. E. satisfying a range from 0.2 to 0.8 allow for the improvement in both the dielectric strength performance and the bending strength compared to the compared examples 1 to 6 that do not satisfy the above composition range.

In the composition range indicated in Examples 1 to 10, the R. E. is selectively absorbed to the Si constituent. Since the Si constituent is likely to be affected by water flow, in the pelletizing by the spray dry method, the Si constituent and the R. E. constituent tend to be condensed in the outside of the granule in the process of evaporating the moisture of the slurry drop. It is considered that, while the press-molding of the ceramic compact with the use of such granules causes the granules to be broken and the outer ring to be broken, a part of them remains unbroken, so that the phase containing the R. E. in the structure of the sintered compact is likely to be condensed thin.

Further, as indicated in FIG. 2, then at least one condensed group, that is, the virtual rectangular frame 310 of 7.5 μm×50 μm surrounding the crystal phase containing the R. E. lies within the enlarged sectional view 300 without overlapping, the bending strength and the heat dielectric strength performance are improved compared to the case where there is no condensed group. In particular, when there are ten or more condensed groups, both the bending strength and the heat dielectric strength performance are further improved.

Table 3 indicates the examination results of the dielectric strength performance and the pressure resistance and the evaluation of the performance of the spark plug 100 with respect to the average particle diameter of the alumina particle of the alumina sintered compact of the insulator 10. The examination of the pressure resistance was made by compressing the center body part 19 via a hard fiber and measuring the compressing weight when a breakage or a crack is confirmed by visual observation. It is noted that a hard fiber of 2.0 t was utilized for the hard fiber and the compressing speed was 5 mm/min.

In Table 3, respective items represent the followings.

Average alumina particle diameter: the average particle diameter of alumina

Dielectric strength: the dielectric strength performance of the spark plug (the insulator 10) when heated at 800° C.

Pressure resistance: the pressure resistance of the spark plug (the insulator 10)

Performance: evaluation result of the performance of the spark plug (the insulator 10)

A represents GOOD (significantly improved from the conventional one)

B represents OK (the same as the conventional one)

TABLE 3

| Average alumina particle diameter (μm) | Dielectric strength (800° C.) (kV) | Pressure resistance (MPa) | Performance |
|---|---|---|---|
| 1.0 | 37.6 | 14.8 | A |
| 3.0 | 36.9 | 13.8 | A |
| 4.0 | 37.0 | 12.8 | A |
| 6.0 | 37.0 | 12.0 | A |
| 8.0 | 36.0 | 12.0 | A |
| 8.5 | 29.0 | 5.9 | B |
| 9.0 | 27.0 | 6.0 | B |

As indicated in Table 3, when the average particle diameter of the alumina particles is less than or equal to 8.0 μm, both the dielectric strength performance and the pressure resistance are improved compared to the case where the average particle diameter of the alumina particles is greater than 8.0 μm, so that the performance of the spark plug (the insulator 10) is improved.

Table 4 indicates the examination results of the dielectric strength performance and the pressure resistance and the evaluation of the performance of the spark plug 100 with respect to the average particle diameter of the crystals containing the R. E. In Table 4, respective items represent the followings.

Particle diameter of the crystals containing the R. E.: the average particle diameter of the crystals containing the R. E.

Dielectric strength: the dielectric strength performance of the spark plug (the insulator 10) when heated at 800° C.

Pressure resistance: the pressure resistance of the spark plug (the insulator 10)

Performance: the evaluation result of the performance of the spark plug (the insulator 10)

A represents GOOD (significantly improved from the conventional one)

B represents OK (the same as the conventional one)

TABLE 4

| Particle diameter of crystals containing R. E. (μm) | Dielectric strength (800° C.) (kV) | Pressure resistance (MPa) | Performance |
| --- | --- | --- | --- |
| 1.0 | 35.0 | 13 | A |
| 2.0 | 37.0 | 13 | A |
| 3.0 | 34.5 | 14 | A |
| 4.0 | 35.0 | 15 | A |
| 5.0 | 35.0 | 14 | A |
| 6.0 | 27.0 | 14 | B |
| 7.0 | 28.0 | 5 | B |
| 7.5 | 27.0 | 5 | B |

As indicated in Table 4, when the average particle diameter of the crystals containing the R. E. is less than or equal to 5 μm, both the dielectric strength performance and the pressure resistance are improved compared to the case where the average particle diameter of the crystals containing the R. E. is greater than 5.0 μm, so that the performance of the spark plug (the insulator 10) is improved.

Table 5 indicates the examination result of the pressure resistance and the performance evaluation of the spark plug 100 with respect to the D90/D10 in the manufacturing process. In Table 5, respective items represent the followings.

D90/D10: The ratio of D90 to D10

Relative density: the relative density of the insulator 10 obtained by the above manufacturing process Pressure resistance: the pressure resistance of the insulator 10 obtained by the above manufacturing process Performance: the performance evaluation result of the insulator 10

A represents GOOD (significantly improved from the conventional one)

B represents OK (the same as the conventional one)

TABLE 5

| D90/D10 | Relative density (%) | Pressure resistance (MPa) | Performance |
| --- | --- | --- | --- |
| 2.9 | 92 | 5.0 | B |
| 3.2 | 92 | 5.0 | B |
| 3.5 | 95 | 12.8 | A |
| 3.8 | 95 | 12.0 | A |
| 4.1 | 95 | 12.0 | A |

TABLE 5-continued

| D90/D10 | Relative density (%) | Pressure resistance (MPa) | Performance |
| --- | --- | --- | --- |
| 4.4 | 95 | 13.0 | A |
| 4.7 | 95 | 12.0 | A |
| 5.0 | 95 | 13.0 | A |
| 5.3 | 95 | 12.0 | A |
| 5.6 | 95 | 11.5 | A |
| 5.9 | 95 | 12.0 | A |
| 6.2 | 93 | 6.0 | B |
| 6.5 | 93 | 7.0 | B |

As indicated in Table 5, the performance is significantly improved in the insulators 10 which are formed using the slurry whose D90/D10 ranges greater than or equal to 3.5 to less than or equal to 5.9, compared to the conventional one.

It is considered that, when the D90/D10 is less than 3.5, the particles excessively react with each other resulting in the abnormal particle growth, which is likely to cause the reduction in the strength of the alumina sintered compact, while when the D90/D10 is greater than 6.0, the reaction among the particles is poor and thus the dense sintered compact cannot be obtained, which is likely to cause the reduction in the dielectric strength performance and/or the mechanical strength.

Table 6 indicates the evaluation result of the segregation state of the particles of the R. E. constituent with respect to the slurry constituent in the manufacturing process. In Table 6, respective items represent the followings.

Slurry moisture: the moisture of the slurry

Segregation group: whether or not there is a thin segregation of the crystal phase containing the R. E.

A represents that there is a segregation

B represents that there is no segregation

TABLE 6

| Slurry moisture (%) | Segregation group |
| --- | --- |
| 16 | B |
| 19 | B |
| 20 | A |
| 25 | A |
| 30 | A |
| 35 | A |
| 40 | A |
| 45 | A |
| 50 | A |
| 55 | B |

As indicated in Table 6, the use of the slurry whose moisture ranges greater than or equal to 20% and less than or equal to 50% causes the thin segregation of the crystal phase containing the R. E. in the pelletization by the spray dry method.

It is considered that, when the slurry moisture is less than 20%, the excessively less moisture in the downstream cannot allow for sufficient movement of the raw particles in the pelletization by the spray dry method, so that the particles of the R. E. constituent are unlikely to be segregated in the outside of the granule, while when the slurry moisture is greater than 50%, all the particles reducing their weight can move easily, so that the R. E. constituent is unlikely to be segregated selectively in the outside of the granule.

Table 7 indicates the viscosity of the slurry with respect to pH of the slurry in the manufacturing process. The pH and the viscosity of the slurry were measured by the following method. The pH was measured by using a glass electrode hydrogen ion concentration meter, HORIBA, Ltd. (type:

D-51, glass electrode, type: 9621C) with the temperature of the slurry set at 20° C. The viscosity was measured by using a VISCOMETER (model: BHII) Toki Sangyo Co., Ltd. with the temperature of the slurry set at 20° C. In Table 7, respective items represent the followings.

pH: the pH of the slurry

Viscosity: the viscosity of the slurry

TABLE 7

| pH | Viscosity (mPa · s) |
|---|---|
| 2 | 60 |
| 3 | 60 |
| 4 | 60 |
| 5 | 550 |
| 6 | 580 |
| 7 | 670 |
| 8 | 740 |
| 9 | 890 |
| 10 | 970 |
| 11 | 1050 |
| 12 | 3900 |
| 13 | 3500 |
| 14 | 5800 |

As indicated in Table 7, when the pH of the slurry is greater than or equal to 5 and less than or equal to 11, the viscosity results in 550 mPa.s to 1050 mPa.s, which is the preferable viscosity for having the thin crystal phase containing the R. E segregated.

It is considered that, when the pH of the slurry is less than 5, the zeta potential decreases close to the isoelectric point and thus the particles are easily condensed, so that the raw material in the slurry is likely to precipitate resulting in the composition different from the desired value. When the pH of the slurry is greater than 11, the change in the zeta potential tends to be larger and thus the viscosity of the slurry becomes excessively higher, which suppresses the movement of the raw material containing the R. E., so that the raw material containing the R. E. is unlikely to be condensed to the outside of the granule in the pelletizing.

Table 8 indicates the examination result of the heat dielectric strength performance and the pressure resistance and the performance evaluation of the spark plug 100 with respect to the content ratio of the silicon dioxide (Si) in the alumina sintered compact of the insulator 10. In Table 8, respective items represent the followings.

$SiO_2$ amount: the content ratio of the silicon dioxide

The number of condensed groups: the number of virtual rectangular frame 310 of 7.5 μm×50 μm surrounding the crystal phase containing the R. E. within the enlarged sectional view 300 without overlapping Dielectric strength: the measured value of the dielectric strength performance of the spark plug (the insulator 10) when heated at 800° C.

Pressure resistance: the pressure resistance of the spark plug (the insulator 10)

Performance: the performance evaluation result of the spark plug (the insulator 10)

A represents GOOD (significantly improved from the conventional one)

B represents OK (the same as the conventional one)

TABLE 8

| $SiO_2$ amount (wt %) | The number of condensed groups | Dielectric strength (800° C.) (kV) | Pressure resistance (MPa) | Performance |
|---|---|---|---|---|
| 0.5 | 20 | 32.0 | 6.5 | B |
| 2.0 | 18 | 33.0 | 12.0 | A |
| 2.1 | 19 | 35.5 | 11.5 | A |
| 2.2 | 20 | 36.0 | 11.0 | A |
| 2.6 | 20 | 35.5 | 12.0 | A |
| 2.8 | 17 | 35.0 | 12.4 | A |
| 3.2 | 11 | 34.0 | 11.5 | A |
| 3.4 | 5 | 30.0 | 11.1 | A |
| 3.8 | 5 | 24.2 | 11.0 | B |

As indicated in Table 8, when the content ratio of the silicon dioxide in terms of an oxide represented by mass percentage is greater than or equal to 2.0 wt % and less than or equal to 3.4 wt %, both the dielectric strength performance and the pressure resistance of the spark plug (the insulator 10) are improved compared to the conventional one. In particular, when the content ratio of the silicon dioxide is greater than or equal to 2.1 wt % and less than or equal to 2.6 wt %, the dielectric strength value of the spark plug (the insulator 10) is 35.5 kV or higher and thus the dielectric strength performance is further improved.

B. Modifications

Modification 1:

In the above-described first embodiment, the average particle diameter of the alumina particles contained in the alumina sintered compact of the insulator 10 is less than or equal to 8 μm, and the average particle diameter of the crystals containing the R. E. is less than or equal to 5 μm. In contrast, the average particle diameter of the alumina particles may be greater than 8 μm and/or the average particle diameter of the crystals containing the R. E. may be greater than 5 μm.

Modification 2:

Further, in the alumina sintered compact of the insulator 10, the content ratio of the $SiO_2$ in terms of an oxide represented by mass percentage may be less than 2.2 wt % or greater than 3.2 wt %.

The present invention is not limited to the above-described embodiments, examples, or modifications, and can be achieved in various configurations as long as they do not depart from its concept. For example, the technical features in the embodiments, the examples, and the modifications corresponding to the technical features in respective forms described in the section of Summary of the Invention can be replaced or combined as appropriate in order to achieve a part of or all of the above-described objects or in order to attain a part of or all of the above-described advantages. Further, unless such technical feature is described as essential in the present specification, it may be deleted as appropriate.

DESCRIPTION OF REFERENCE NUMERALS

3: Ceramic resistor
4: Seal body
5: Gasket
6: Ring member
8: Plate packing
9: Talc
10: Insulator 12: Axial hole
13: Nose portion
17: Front end body part
18: Rear end body part
19: Center body part
20: Center electrode
30: ground electrode
40: Terminal metal fitting
50: Metal shell
51: Tool engaging part
52: Installation thread part
53: Crimping part
54: Seal part
56: Metal shell inner step
57: Front end surface
58: Compressed deformation part
100: Spark plug
200: Engine head
201: Installation thread opening
300: Engaging part
310: Rectangular frame
310a: Long side
350: Crystal containing R. E.
360: Alumina particle
400: Sintered compact
401: Ring
402: Base part

The invention claimed is:

1. An insulator used in a spark plug, said insulator comprising:
a sintered compact comprising alumina as a main constituent, a rare earth element, silicon, and a plurality of group 2 elements including barium oxide,
wherein the group 2 elements are listed in the periodic table of elements based on IUPAC Recommendation 1990,
wherein a first content ratio of the rare earth element to the group 2 elements, in terms of an oxide represented by mass percentage, satisfies a range from 0.1 to 1.4,
wherein a second content ratio of the barium oxide to the rare earth element, in terms of an oxide represented by mass percentage, satisfies a range from 0.2 to 0.8,
wherein a third content ratio of the silicon to a sum of the silicon and the group 2 elements, in terms of an oxide represented by mass percentage, is less than 0.60,
wherein an average particle diameter of particles of the alumina is less than or equal to 8 µm,
wherein an average particle diameter of crystals containing the rare earth element is less than or equal to 5 µm,
wherein at least one virtual rectangular frame of 7.5 µm×50 µm surrounding the crystals containing the rare earth element lies within a region of 630 µm×480 µm in any cross section of the sintered compact,
wherein, in the rectangular frame, an occupancy ratio of an area of the crystals containing the rare earth element to an area of the rectangular frame is greater than or equal to 5%,
wherein the rectangular frame is equally divided into three regions in a direction of a long side of the rectangular frame,
wherein each of the regions has a regional occupancy ratio defined by an area within the region of the crystals containing the rare earth element to an area of the region, and
wherein a ratio of a maximum of the regional occupancy ratios to a minimum of the regional occupancy ratios is less than or equal to 5.5%.

2. The insulator according to claim 1, wherein ten or more of the rectangular frames lie within the region of 630 µm×480 µm in any cross section of the sintered compact.

3. The insulator according to claim 1, wherein a content of the silicon in the sintered compact, in terms of an oxide represented by mass percentage, is greater than or equal to 2.0 wt % and less than or equal to 3.4 wt %.

4. The insulator according to claim 3, wherein the content of the silicon in the sintered compact, in terms of an oxide represented by mass percentage, is greater than or equal to 2.1 wt % and less than or equal to 2.6 wt %.

5. A spark plug comprising:
an insulator including a sintered compact, the sintered compact comprising alumina as a main constituent, a rare earth element, silicon, and a plurality of group 2 elements including barium oxide,
wherein the group 2 elements are listed in the periodic table of elements based on IUPAC Recommendation 1990,
wherein a first content ratio of the rare earth element to the group 2 elements, in terms of an oxide represented by mass percentage, satisfies a range from 0.1 to 1.4,
wherein a second content ratio of the barium oxide to the rare earth element, in terms of an oxide represented by mass percentage, satisfies a range from 0.2 to 0.8,
wherein a third content ratio of the silicon to a sum of the silicon and the group 2 elements, in terms of an oxide represented by mass percentage, is less than 0.60,
wherein an average particle diameter of particles of the alumina is less than or equal to 8 µm,
wherein an average particle diameter of crystals containing the rare earth element is less than or equal to 5 µm,
wherein at least one virtual rectangular frame of 7.5 µm×50 µm with surrounding the crystals containing the rare earth element lies within a region of 630 µm×480 µm in any cross section of the sintered compact,
wherein, in the rectangular frame, an occupancy ratio of an area of the crystals containing the rare earth element to an area of the rectangular frame is greater than or equal to 5%,
wherein the rectangular frame is equally divided into three regions in a direction of a long side of the rectangular frame,
wherein each of the regions has a regional occupancy ratio defined by an area within the region of the crystals containing the rare earth element to an area of the region, and
wherein a ratio of a maximum of the regional occupancy ratios to a minimum of the regional occupancy ratios is less than or equal to 5.5%.

6. A spark plug according to claim 5, wherein ten or more of the rectangular frames lie within the region of 630 µm×480 µm in any cross section of the sintered compact.

7. A spark plug according to claim 5, wherein a content of the silicon in the sintered compact, in terms of an oxide represented by mass percentage, is greater than or equal to 2.0 wt % and less than or equal to 3.4 wt %.

8. A spark plug according to claim 7, wherein the content of the silicon in the sintered compact, in terms of an oxide represented by mass percentage, is greater than or equal to 2.1 wt % and less than or equal to 2.6 wt %.

9. An insulator used in a spark plug, said insulator comprising:
a sintered compact comprising alumina as a main constituent, a rare earth element, silicon, and a plurality of group 2 elements including barium oxide,
wherein the group 2 elements are listed in the periodic table of elements based on IUPAC Recommendation 1990,
wherein a first content ratio of the rare earth element to the group 2 elements, in terms of an oxide represented by mass percentage, satisfies a range from 0.1 to 1.4, wherein a second content ratio of the barium oxide to the rare earth element, in terms of an oxide represented by mass percentage, satisfies a range from 0.2 to 0.8, wherein a third content ratio of the silicon to a sum of the silicon and the group 2 elements, in terms of an oxide represented by mass percentage, is less than 0.60, wherein at least one virtual rectangular frame of 7.5 μm×50 μm surrounding the crystals containing the rare earth element lies within a region of 630 μm×480 μm in any cross section of the sintered compact, wherein, in the rectangular frame, an occupancy ratio of an area of the crystals containing the rare earth element to an area of the rectangular frame is greater than or equal to 5%, wherein the rectangular frame is equally divided into three regions in a direction of a long side of the rectangular frame, wherein each of the regions has a regional occupancy ratio defined by an area within the region of the crystals containing the rare earth element to an area of the region, and wherein a ratio of a maximum of the regional occupancy ratios to a minimum of the regional occupancy ratios is less than or equal to 5.5%.

\* \* \* \* \*